Oct. 26, 1943.  W. R. TUCKER  2,332,679
METHOD OF INJECTION MOLDING
Filed April 22, 1940  8 Sheets-Sheet 1
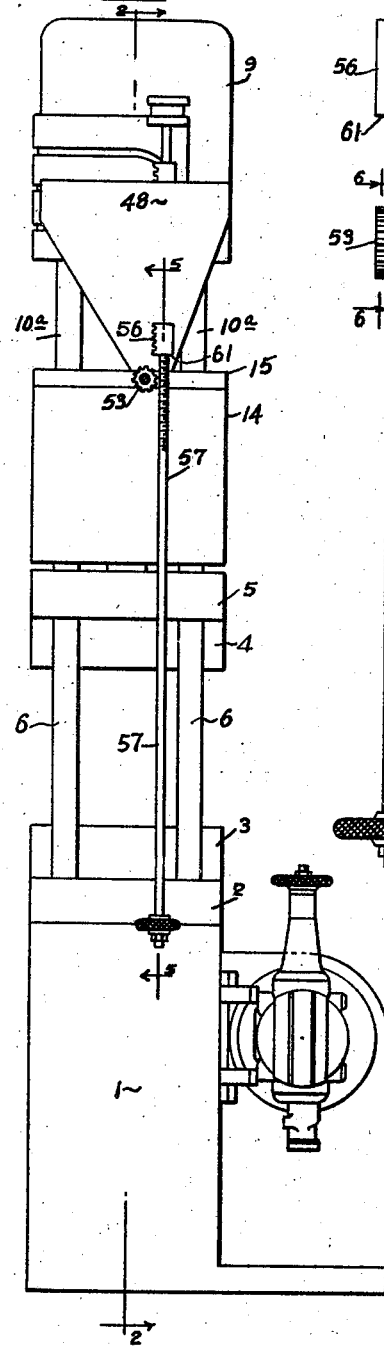
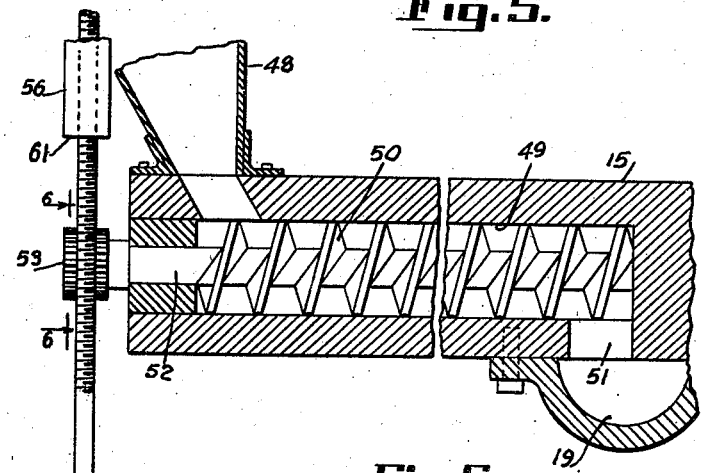
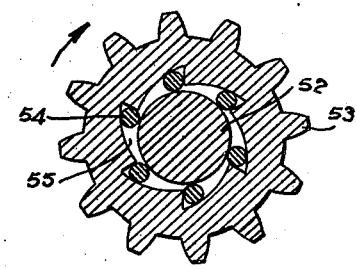
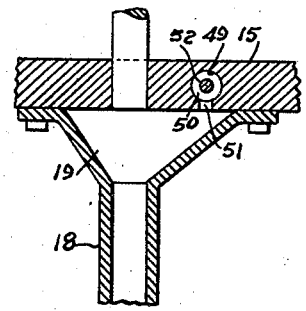
Inventor
WARREN R. TUCKER,
By Faulkner & Faulkner
Attorneys

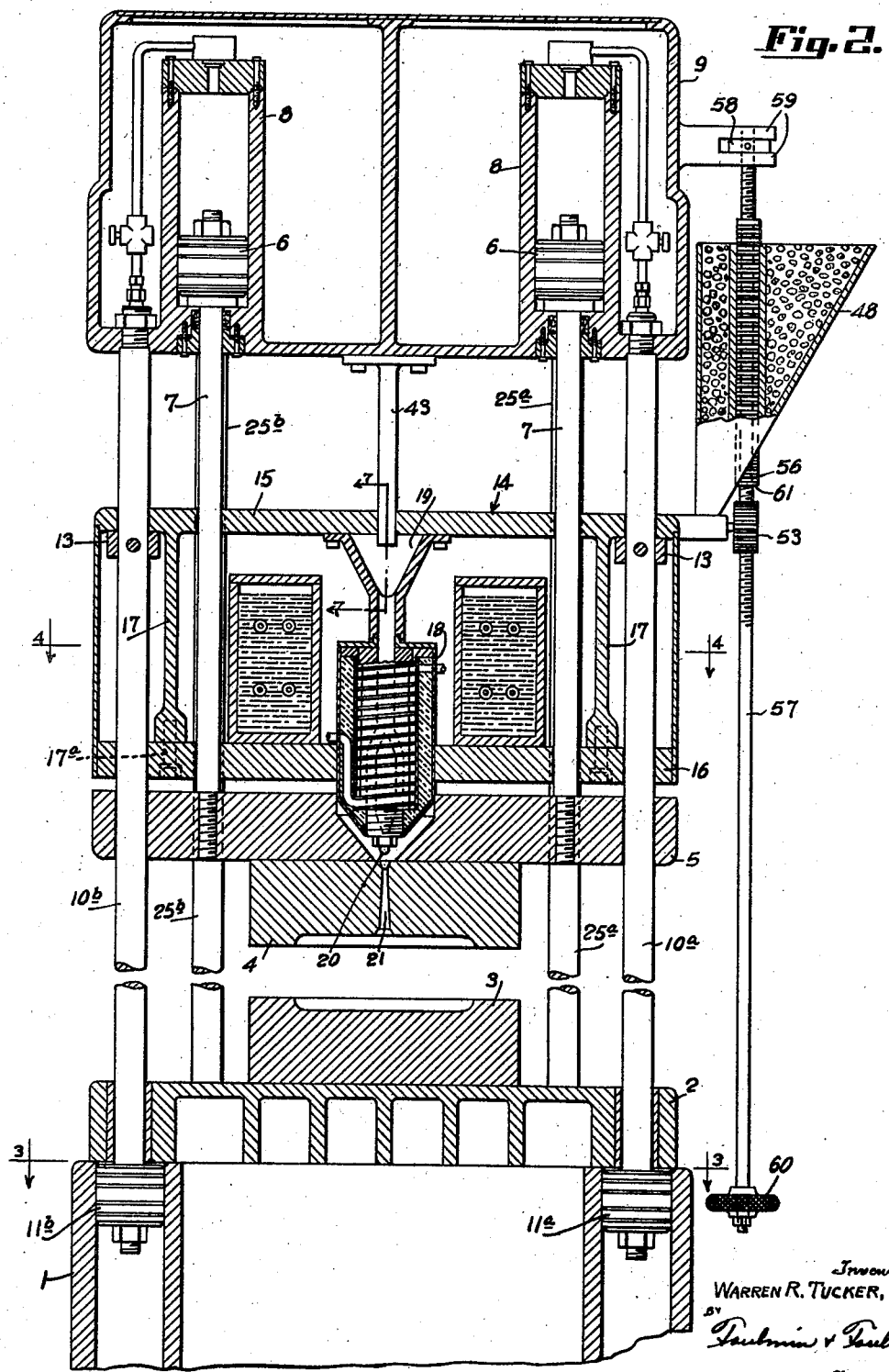

Oct. 26, 1943.   W. R. TUCKER   2,332,679
METHOD OF INJECTION MOLDING
Filed April 22, 1940   8 Sheets-Sheet 3

INVENTOR
WARREN R. TUCKER,
BY Toulmin & Toulmin
Attorneys

Oct. 26, 1943.  W. R. TUCKER  2,332,679
METHOD OF INJECTION MOLDING
Filed April 22, 1940   8 Sheets-Sheet 4
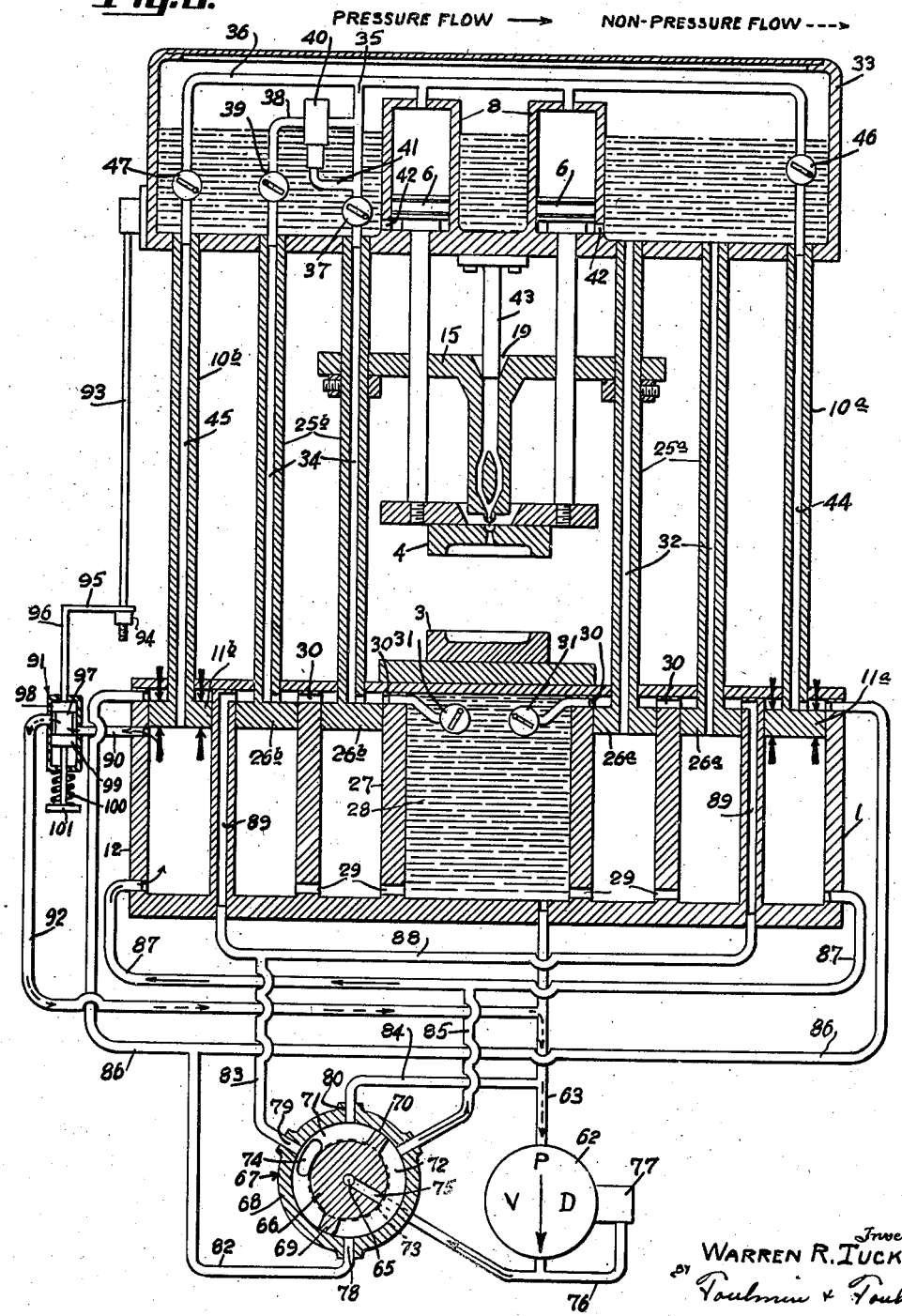

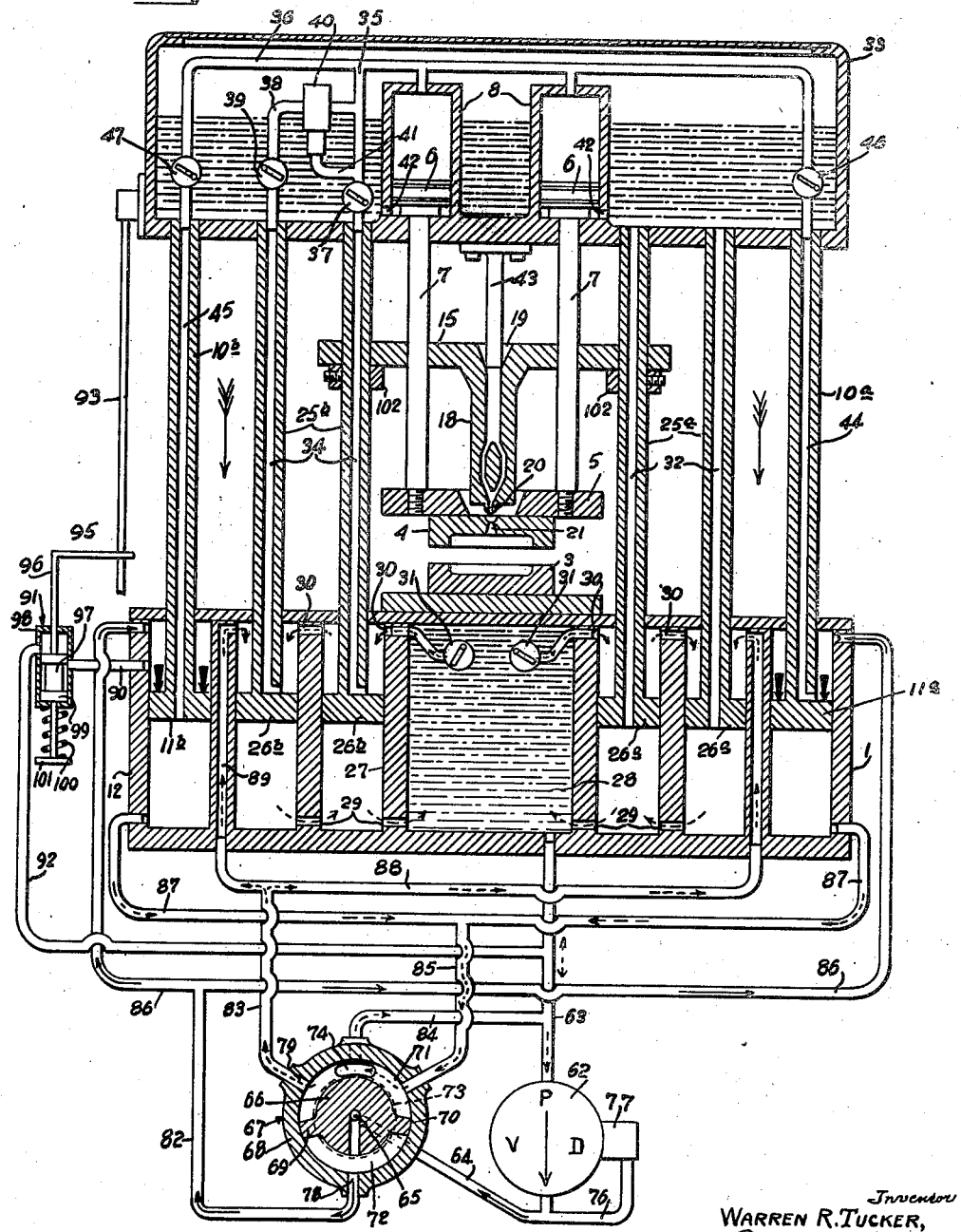

Oct. 26, 1943. W. R. TUCKER 2,332,679
METHOD OF INJECTION MOLDING
Filed April 22, 1940 8 Sheets-Sheet 7

EFFECTIVE PRESSURES ↕↕   MOTION OF PRESS ↓

PRESSURE FLOW  ⟶   NON-PRESSURE FLOW --▶

Inventor
WARREN R. TUCKER,
Toulmin & Toulmin
Attorneys

Oct. 26, 1943.  W. R. TUCKER  2,332,679
METHOD OF INJECTION MOLDING
Filed April 22, 1940  8 Sheets-Sheet 8
Fig. 13
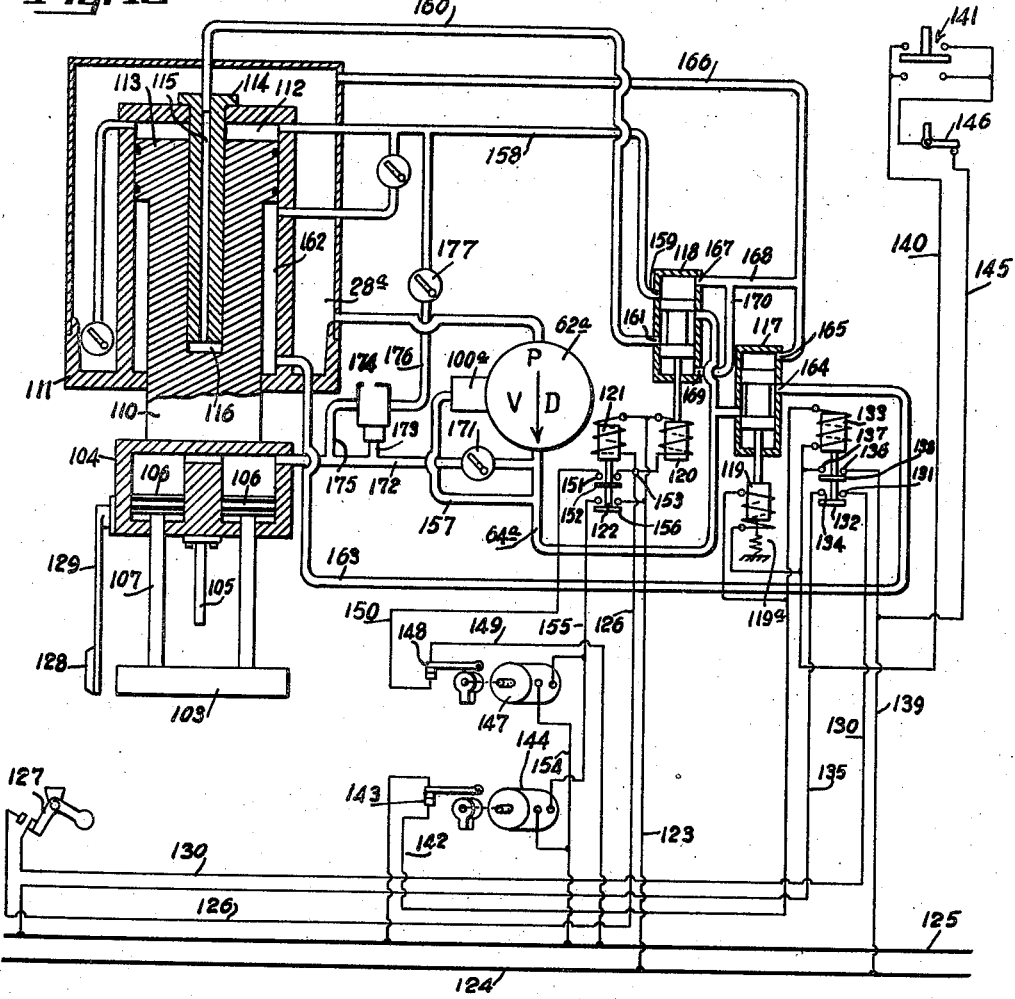
Fig. 12.
Fig. 14.
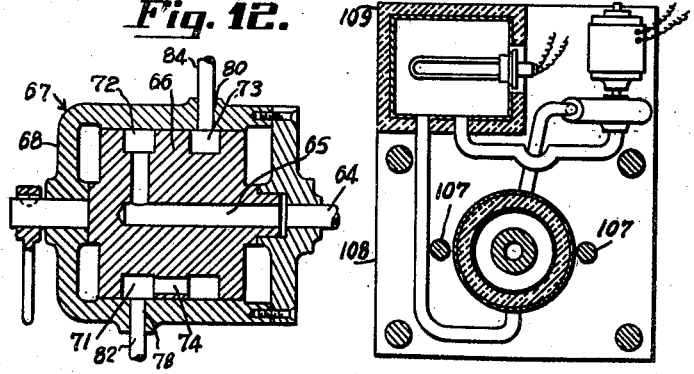
Inventor
WARREN R. TUCKER,
By Toulmin & Toulmin
Attorneys Patented Oct. 26, 1943

2,332,679

UNITED STATES PATENT OFFICE 2,332,679

METHOD OF INJECTION MOLDING

Warren R. Tucker, Dayton, Ohio, assignor to The Hydraulic Development Corp. Inc., Wilmington, Del., a corporation of Delaware Application April 22, 1940, Serial No. 330,869

4 Claims. (Cl. 18—55)

The present invention relates to molding, and in particular to injection molding.

It is an object of the invention to provide a method of injection molding which will simplify and speed up the injection process.

It is another object of the invention which will enable rapid injection of the material to be molded, thereby increasing the quantity of the molded articles.

A further object of the invention consists in the provision of a method of injection molding which is simple in application and cheaper than injection molding methods heretofore used.

Still another object of the invention consists in the provision of a simplified method of injection molding which may be carried out in molding machines materially simpler in construction and smaller in size than molding machines heretofore used for similar purposes.

These and other objects and advantages will appear more clearly from the following description in connection with the accompanying drawings which illustrate molding machines for carrying out the new method and in which:

Figure 1 is a side elevation of a press adapted to carry out the molding method of the present invention.

Figure 2 is a vertical section along the line 2—2 of Figure 1.

Figure 5 is a vertical section along the line 5—5 of Figure 1, and shows details of the automatically proportioned feeding mechanism for the material to be molded.

Figure 6 is a vertical section along the line 6—6 of Figure 5 illustrating details of the one-way feeding sprocket.

Figure 7 is a vertical section along the line 7—7 of Figure 2 illustrating the feed chamber surrounding the injection plunger.

Figures 8, 9, 10 and 11 are a simplified diagrammatic illustration of a press for carrying out the method according to the present invention and illustrating different stages of the molding operation.

Figure 12 shows a detail of the main valve used in connection with the embodiment of Figures 8 to 11.

Figure 13 is a diagrammatic view of a modified press, and

Figure 14 illustrates an oil heating chamber used in connection with the embodiment of Figure 13.

Figure 4:
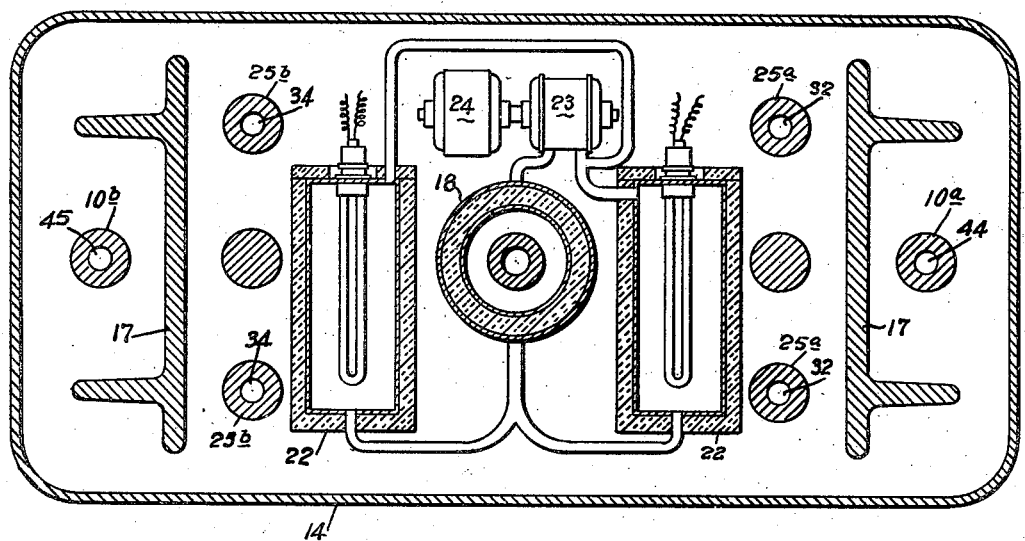
Figure 4 is a horizontal section along the line 4—4 of Figure 2.
Figure 3:
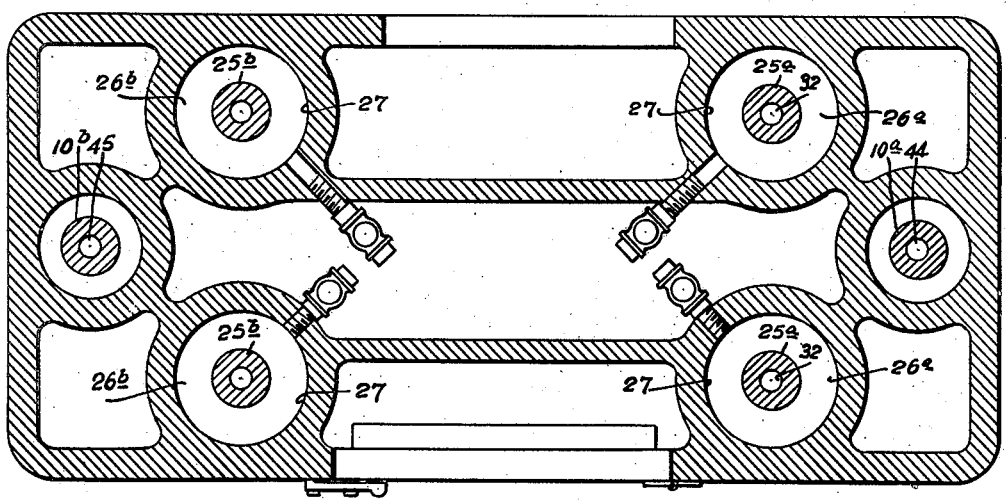
Figure 3 is a horizontal section along the line 3—3 of Figure 2, looking in the direction of the arrows.

Referring to the drawings in detail and, first, particularly to the embodiment shown in Figures 1 to 11, 1 designates the bed of the press upon which is fixedly mounted or held by gravity the lower bolster 2 carrying the lower mold half 3. The upper mold half 4 is carried by the upper bolster 5 which is operatively connected with the clamping and cushioning pistons 6 by clamping rods 7, which are attached in any suitable manner with the upper bolster 5.

The pistons 6 are adapted to reciprocate within the clamping and cushioning cylinders 8 which are formed integrally with the clamping and injecting head 9 of the press. These cylinders 8 being formed within the clamping and injecting head 9 and having the form of a hollow casting.

Depending from and fixedly attached at the upper ends in any suitable manner to the head 9 are a pair of rods 10a, 10b which function as both booster and push-back rods, having mounted fixedly at their lower ends, the booster and push-back pistons 11a, 11b. The pistons 11a, 11b reciprocate within cylinders 12 formed in the bed 1, as for example, by being made integral with the casting which constitutes the bed 1. The space above the pistons 11a, 11b is employed for pulling the head 9 downwardly, while the space below the pistons 11a, 11b is used for pushing the head 9 upwardly.

The rods 10a, 10b have mounted thereon, in any suitable manner, collars 13 which support the platen 14 so that platen 14 is free to traverse that portion of the rods 10a, 10b which lies between the collars 13 and the head 9. The platen 14 is supported by gravity on the collars 13 when the press is in the position shown in Figure 2. The platen 14 is made up of an upper plate 15 and a lower plate 16, these plates being secured together in spaced relationship by the webs 17 of plate 15 and bolts 17a passing through the plate 16 into the webs 17.

Fixedly mounted on the platen 14 is the injection cylinder generally designated 18 which is attached to the upper plate 15 centrally thereof by means of the feed chamber 19. The feed chamber 19 serves for feeding molding material into the injection cylinder and also serves for holding a reserve of the molding material in a manner which will presently appear.

The injection cylinder 18 depends from the feed chamber 19 downwardly through the plate 16 which, when the press is retracted is held a short distance above the upper bolster 5. The injection cylinder 18 is thus held initially a somewhat smaller distance from the bolster 5, so that when the platen 14 is lowered the injection nozzle 20 will engage the injection gate 21 of the mold half 4 before the plate 16 rests upon the upper bolster 5.

Contained within the platen 14 are a pair of heating tanks 22 from which heated oil or the like is circulated through suitable oil heating passageways provided around the injection cylinder 18 in the usual manner. A pump 23 driven by motor 24 being employed for this purpose. The provision of the heating means within the platen 14 makes for a more compact and neater assembly.

Secured to and depending downwardly from the head 9 in a manner similar to the rods 10a, 10b are four main rods 25a, 25b, which extend downwardly and slideably through bolster 2 into the bed 1 of the press where they are provided with main pistons 26a, 26b operated slideably within the vertical cylinders 27 formed integrally with the casting of the bed 1. The space above these pistons is employed as the main pressing area in a manner which will presently appear. The space below these pistons is in constant and free communication with a lower liquid tank or reservoir 28 (Figure 8) formed in the bed 1 of the press by the casting thereof. This communication is maintained by the ports 29 formed at the bottom of the cylinders 27. The space above the pistons 26a and 26b is in constant check-valved communication with the reservoir 28 by the conduits 30 which extend through the walls of the cylinders 27 into the reservoir 28 and which are provided on their inward ends with a check valve 31 adapted to allow liquid to freely flow from the reservoir 28 into these spaces but to prevent the reverse flow.

The main rods 25a are provided with bores 32 which extend from their uppermost end down through the pistons 26a into communication with the spaces below the pistons 26a. The bores 32 are also in free and constant communication with an oil reservoir or tank 33 formed in the head 9 of the press. In this way, the reservoir 33 is in constant communication with the reservoir 28 so that the reservoir 28 is always filled.

The main rods 25b are provided with bores 34 which at all times are in communication with the space above the pistons 26b, as indicated in Figures 8 to 11. One of these bores 34 is connected by a line 35 with a line 36 leading to the spaces above the clamping pistons 6. A check valve 37 is arranged in the line 35 in such a manner as to allow the free flow upwardly therein but to prevent the flow in the reverse direction. The other bore 34 communicates at its upper end with a pipe 38 which in its turn communicates with the line 36 above the check valve 37. The pipe 38 is provided with a check valve 39 adapted to allow flow of fluid downwardly into the adjacent bore 34, but prevents the flow of fluid in the reverse direction, viz. upwardly.

Interposed in the pipe 38 is a relief or unloading valve 40 which is adapted to be actuated by the pressure built up in the line 35 and transmitted through a line 41 from line 35 so as to allow free discharge from the space above the clamping piston 6 when the pressure thereabove exceeds a predetermined amount. The unloading valve 40 is preferably adjustable so as to allow adjustment of the pressure at which the unloading will take place, thereby determining the clamping pressure. As will be obvious, the unloading valve 40 is normally closed and is opened only when the clamping pressure for clamping the mold halves together exceeds a predetermined value. The unloading valve 40 is so adjusted that it remains closed while the clamping and injecting head 9 moves downwardly causing the piston 6 to be telescoped in the clamping cylinders 8.

To allow the relief of the underside of the clamping piston 6, ports 42 are provided in the lower portions of the clamping cylinders 8, these ports leading directly into the upper reservoir 33.

The clamping and injecting head 9 carries on its lower face the injection plunger 43 which is slidably received downwardly through a bore in the upper plate 15 (Figure 2) of the platen 14 and which is in alignment with the injection cylinder 18.

The right-hand booster and push-back rod 10a is provided with an axial bore 44 which communicates at its lower end with the space above the booster and push-back piston 11a and which communicates at its top with the line 36 comprising a check valve 46 which allows fluid pressure from above the push-back and booster piston 11a to be transmitted to the clamping cylinders 8, but prevents the reverse flow of fluid. The left-hand booster and push-back rod 10b is provided with an axial bore 45 which extends downwardly through the booster and push-back piston 11b into communication with the space therebelow and which at its upper end is connected to the upper end of line 36 comprising a check valve 47. The check valve 47 is adapted to allow pressure below the piston 11b to be transmitted to the clamping cylinders, but to prevent the flow of fluid in the reverse direction. Thus, since one or more of the main pressing areas, viz. the areas above the main pistons 26a and 26b, and of the booster areas, viz. the areas above the push-back pistons 11a, 11b and of the push-back areas, viz. the areas below the push-back pistons 11a, 11b are supplied with liquid pressure at all times, the clamping cylinders 8 are at all times supplied with liquid pressure.

*Feeding mechanism*

The feeding mechanism as illustrated in Figures 2, 5, 6 and 7 comprises a hopper 48 for the molding material which is mounted on a right-hand extension of the upper plate 15 of the platen 14. The hopper 48 is adapted to feed the molding material into the cylindrical bore 49 formed in the plate 15. A screw conveyor 50 is interposed in the bore 49 and is adapted to feed the material inwardly through a downwardly extending bore 51 into the feed chamber 19 arranged above and around the injection bore of the injection cylinder 18. Mounted on the outward end of the shaft 52 of the conveyor 50 is a pinion 53 adapted to drive the shaft 52 in only one direction of rotation through the intervention of the rollers 54 mounted in the tapering slots 55 of the pinion 53. The silent ratchet thus formed is adapted to drive feed screw 50 only when the pinion 53 is rotated in the direction indicated by the arrow A, so that the rollers 54 are clamped between the wall of the slots 55 and the shafts 52. When the shaft 52 rotates in a direction opposite to the direction indicated by the arrow A, the rollers 54 are released so that they rotate freely between the pinion 53 and the shaft 52 thereby allowing pinion 53 to idle.

The feed pinion 53 may be driven by a rack 56 which is screw-threadedly mounted on an actuating and adjusting rod 57 mounted vertically on the right-hand side of the press. The rod 57 has at its upper end a fixedly attached collar 58 which is received rotatably between the ears 59 supported by and rigidly connected with the head 9. The collar 58 prevents the rod 57 from moving vertically relative to the head 9, but allows free rotation of the rod 57. Thus, the rack 56 may be adjusted vertically by rotating the rod 57 by means of the hand wheel 60 at its lower end which is readily accessible to the operator. In order to adjust the point of stopping of the injection plunger 43, the rack 56 is adjusted vertically by means of the hand wheel 60. This adjustment is effected by changing the point at which the lower end 61 of the rack 56 engages the pinion 53 and starts rotation thereof on the downward stroke of the head 9. Thus, the rack 56 is moved upwardly and the end 61 will engage the pinion 53 somewhat later than it would if the rack 56 is moved downwardly, and consequently the feed screw 50 will be rotated a less amount when the head 9 moves downwardly during its injection stroke. It will be understood that while the arrangement is shown as feeding during the downward stroke of the head 9, it may, if desired, be reversed so that feeding takes place during the upward stroke.

From the foregoing, it will be seen that no feeding takes place while the head 9 and the platen 14 are moving downwardly together, because when this is happening there is no relative movement between the head 9 and the platen 14. On the other hand, feeding starts at the moment when the mold halves 3 and 4 are clamped together, since then the platen 14 remains stationary while the head 9 moves downwardly. In other words there is a relative movement between the head 9 and the platen 14.

It will be seen further that the feeding will be in direct proportion to the extent to which the injection plunger 43 is received within the injection cylinder 14. It will be understood that when the injection plunger 43 is retracted from the injection cylinder 18, the material which was fed into and accumulated in the chamber 19 around the injection stroke will follow downwardly by gravity into the upper portion of the injection cylinder 18 to replace the material which was injected into the mold.

It will further be seen that the adjustment of the hand wheel 60 and consequent adjustment of the point of engagement of the rack 56 of the pinion 53, the point at which the injection plunger 43 comes to rest may be effected to suit the particular requirements of the article to be molded. It is known that in order to obtain the best polish of the molded piece, the injection plunger 43 should stop at a point just ahead of the torpedo in the injection cylinder 18, and since the amount of the injected material will vary with the size of the molded piece, it will be seen that by the feeding arrangement provided herein, conditions may be readily adjusted so as to bring about this desirable result with a piece of any size.

*Hydraulic circuits*

The hydraulic circuit of the embodiment, shown in Figures 8 to 11, comprises a one-way variable delivery pump 62 adapted to supply liquid pressure for actuating the various hydraulic motors. The pump 62 draws liquid from the tank 28 through a conduit 63 and supplies it under pressure through the conduit 64 into the bore 65 provided in the valve core 66 of the valve 67. The valve core 66, which is rotatably mounted in the valve casing 68 comprises two half-circular recesses which are separated from each other by ribs 69 and 70, and form together with the wall of the valve casing 68 two chambers 71 and 72 respectively. The valve core 66 further comprises an annular recess 73 (Figure 12) which communicates through a bore 74 with the chamber 71. The bore 65 communicates through a chamber 75 with the chamber 72.

A conduit 76 leads from the outlet conduit 74 of the pump 62 to a servo-motor 77 operatively connected with the pump and adapted to cause the movement of the pump to neutral or no-delivery position when a predetermined pressure is developed in the conduit 64. This enables the holding of the injection plunger 43 inwardly under pressure at the end of the injection stroke.

The valve casing 68 has four ports 78, 79, 80 and 81 respectively connected with the conduits 82, 83, 84 and 85. The conduit 82 leads into a branched conduit 86 leading to the booster areas above the pistons 11a and 11b, the push-back areas below the pistons 11a and 11b and connected by the conduits 87 with the conduit 85 leading to the valve 67.

The main pressing areas located above the main pistons 26a, 26b are connected to the branched conduit 88 which leads by means of the conduit 83 to the valve port 79. When the valve 67 is in the position shown in Figure 11 of the drawings, the pump 62 supplies liquid pressure into the push-back areas below pistons 11a and 11b through the conduits 85 and 87, while the booster areas above the push-back pistons 11a, 11b are connected with the suction side of the pump 62 through the conduits 78, 82, the bores 74 into conduit 84. Furthermore, fluid pressure is conveyed through the conduits 45 and 36 into the clamping or cushioning cylinders 8. Fluid pressure also acts through the conduits 83 and 88 and bores 89 in the cylinders 12 upon the upper surface of the main pistons 26a and 26b.

Since the push-back areas and the clamping areas, viz. the areas below the push-back pistons 11a, 11b and the areas above the clamping pistons 6 are greater than the main areas, viz. the areas above the pistons 26a, 26b, the pistons 11a, 11b and 26a, 26b will move upwardly thereby lifting the press head 9 upwardly. In order to limit the upward travel of the press head 9, the left-hand push-back cylinder 12 is provided with an over-travel port 90 which is adapted to be connected by a two-way valve 91 to a conduit 92 leading to the inlet conduit 63 of the pump 62 and thus to the tank 28.

The press head 9 carries a shifting rod 93 which is provided with an adjustable collar 94 adapted to engage an arm 95 on a rod 96 at the point where it is desired to have the head 9 stopped. The rod 96 is connected with a valve member 97 carrying pistons 97 and 99 adapted alternately to effect and interrupt communication between the conduits 90 and 92.

A spring 100 is provided between the casing of the valve 91 and a shoulder 101 on a downward extension of the rod 96 and is adapted normally to maintain the valve 91 closed, but to yield so as to allow communication between the conduits 90 and 92 when the head 9 regains its upper position. Thus it is insured that the head 9 will stop its upward movement at a predetermined point and yet the push-back function of the lower side of the piston 11b is retained.

Should the head 9 drift downwardly slightly, it would cause the valve 91 to be closed whereupon the pressure delivered into the conduit 87 would be immediately applied to the push-back pistons 11a, 11b to cause upward travel of the head 9 until the valve 91 is again opened.

Operation

When the press is idling, the parts occupy the position shown in Figure 8. The pump 62 is constantly delivering pressure fluid through the conduit 64, the bore 65, the channel 75, the chamber 72, the conduits 82 and 86 into the space above the pistons 11a and 11b. At the same time the pressure fluid flows from the chamber 72 of the valve 67 through the conduits 85 and 87 into the space below the pistons 11a and 11b. From the space below the piston 11b, fluid pressure flows through the conduit 90, the valve 91 and the conduit 92 back into the conduit 63. Fluid pressure furthermore acts through the bores 44 and 45 and the conduit 36 upon the upper surface of the clamping pistons 6. This pressure maintains the pistons 6 bottomed in the cylinders 8.

Both sides of the main pistons 26a and 26b communicate through the ports and conduits 29 and 30 with the tank 28. To start the head 9 downwardly in a pressing operation, the valve core 66 may either manually, or by any desired mechanism, be shifted into the position shown in Figure 9. As will be clear from Figure 9, fluid pressure supplied by the pump 62 is delivered through the conduit 64, the bore 65, the channel 75, the chamber 72, into conduits 82 and 86 into the space above the push-back pistons 11a, 11b. The space below the pistons 11a, 11b now communicates through the conduits 87 and 85 with the chamber 71 and through the bore 74 and the conduit 84 with the suction side of the pump 62. Since the space above and below the main pistons 26a and 26b communicate, as in the idling position of the press, with the conduit 63, the fluid pressure acting upon the upper surface of the push back pistons 11a and 11b causes the pistons 11a, 11b to move downwardly thereby also moving the press head 9 downwardly. During this operation, fluid below the push-back pistons 11a, 11b may escape through the conduits 87 and 85 into the chamber 71 and from there into the bore 74, into the conduit 63 leading to the suction side of the pump 62. Fluid below the main pistons 26a, 26b may escape through the ports 29 into the tank 28 or through the bores 32 into the tank 33.

Figure 10:
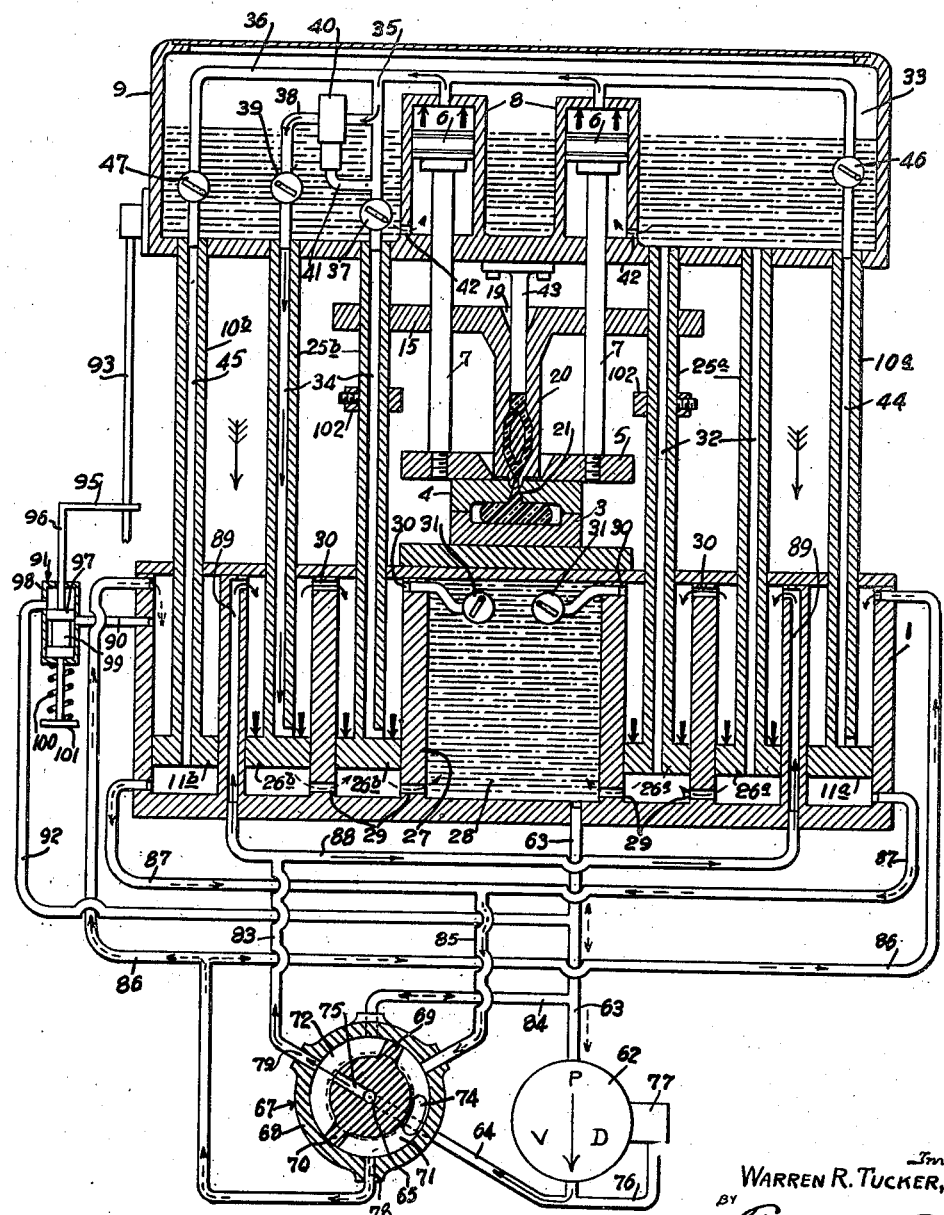

When the upper mold half 4 has engaged or is about to engage the lower mold half 3, the valve core 66 is shifted manually, or by any other suitable mechanism, into the position shown in Figure 10. In this position of the valve 67 the pump 62 delivers pressure fluid through the conduit 64, the bore 65, the channel 75 into the chamber 72. From here pressure fluid flows through the conduits 83 and 88 into the space above the main pistons 26a and 26b. The space below the main pistons 26a, 26b communicates through the ports 29 with the fluid tank 28. The spaces below and above the push-back pistons 11a, 11b now communicate respectively through the conduits 86 and 82 and the conduits 87 and 85 with the chamber 71 which, in its turn, communicates through the bore 74 and the conduits 84 and 63 with the suction side of the pump 62 and with the fluid tank 28. Consequently, the pressure acting upon the upper surfaces of the main pistons 26a, 26b causes the press head 9 to continue its downward movement.

Since previously the mold halves had engaged each other so that a further downward movement of the clamping pistons 6 is not possible, the downward movement of the press head 9 causes pressure to build up in the clamping cylinder which acts through the conduit 41 on the unloading valve 40 so that at a predetermined pressure in the clamping cylinders 8 fluid may escape through the conduit 35 the unloading valve 40 and the conduit 38, the check valve 39 and the bore 34 into the space above the main pistons 26a and 26b, thereby supplementing the fluid above the pistons 26a and 26b and causing a fast injection stroke. It is obvious that if the limited output of the pump 62 were applied to both the main and the booster areas, the injection would be slower than in the arrangement described above in which the effective area of the main pressing pistons 26a, 26b is lowered by an amount equal to the area of the clamping piston 6. The head 9 now continues downwardly under the action of the pressure liquid applied to the main pressing spaces, the application of pressure to the clamping pistons 6 being maintained in the clamping cylinders 8. This continued downward movement of the press head 9 causes entry of the injection plunger 43 into the injection cylinder 18, causing first a firm clamping of the injection cylinder to the upper mold half 4 and thereafter causing the actual fast injection.

Figure 11:
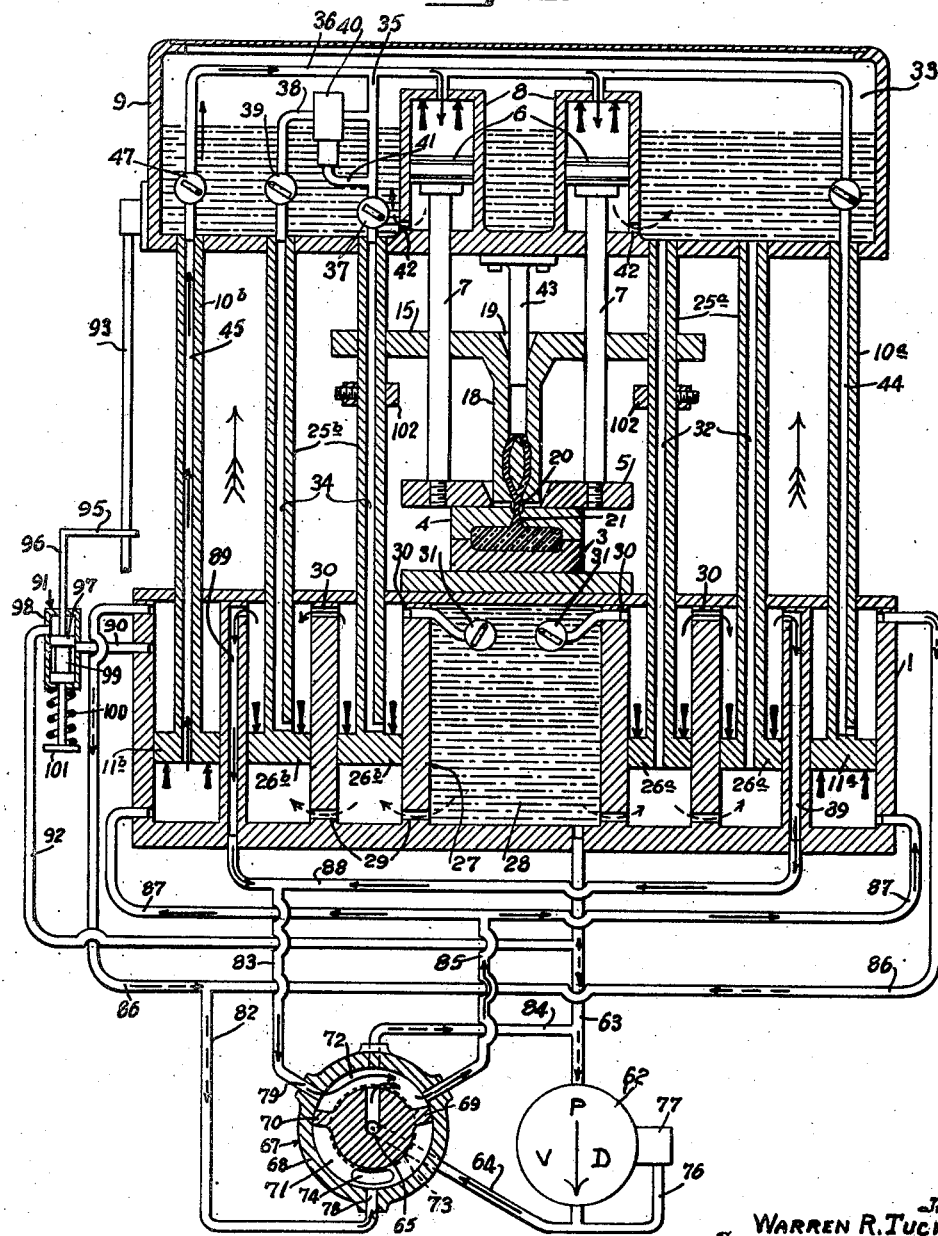

As soon as the mold cavity is filled and the injection stroke finished, the valve core 66 is manually, or by any other suitable mechanism, shifted into the position shown in Figure 11. In this position the pump 62 delivers pressure fluid through the conduit 64, the bore 65, the chamber 72, and the conduits 85 and 87 into the space below the push-back pistons 11a and 11b. Furthermore, fluid pressure acts through the bore 45 and the conduit 36 upon the upper surface of the clamping piston 6. The pressure side of the pump 62 also communicates through the chamber 72 and the conduits 83 and 88 and the bores 89 with the main areas. Since the push-back areas, together with the clamping areas are greater than the main pressing areas, the press head 9 now starts its retraction stroke. During the first part of the retraction stroke, the pressure in the clamping cylinders still keeps the mold halves closed, while the press head 9 is gradually lifted. Shortly before the pistons 6 bottom in the head 9, the collars 102 connected with the inner main rods 25a and 25b engage the platen 14 so as to space the nozzle 20 from the upper mold half. This is advantageous in so far as the material in the mold has not yet cooled off so that the nozzle does not stick to the material in the mold. When somewhat later the clamping pistons 6 bottom in the press head 9, the retraction of the injection plunger 43 ceases because when the pistons 6 bottom, the area is removed from cooperation with the push-back area and the combined main area of the pressing pistons are greater than the combined areas of the push-back pistons.

Any tendency for the main pressing pistons to force the head 9 downwardly is, however, instantly counteracted since such downward movement unbottoms the clamping pistons 6 rendering the areas effective of conjunction with the push-back areas so as to again cause the head 9 to move upwardly until the pistons 6 bottom. Therefore, the head 9 merely stops in its upward movement and maintains this position because if it moves in either direction from this position it is instantly returned thereto.

Meanwhile, the mold halves have remained clamped under a predetermined pressure and cooling of the molded article is taking place. The press maintains this state until the material in the mold has sufficiently cooled down, whereupon the valve core 66 is either manually, or by any other suitable mechanism, shifted into the position shown in Figure 8. This causes the pump 62 to supply pressure fluid through the conduit 64, the bore 65, the channel 75, the chamber 72 into conduits 85 and 87 into the space below the push-back pistons 11a and 11b.

The space above the push-back pistons 11a and 11b communicates through the conduits 86 and the chamber 72 likewise with the pressure side of the pump 62. However, since the space below and above the main pistons 26a, 26b communicates with the fluid tank and the suction side of the pump, and since the push-back area is greater than the booster area, the push-back pistons 11a and 11b now raise the press head 9.

It will be noted that during this last portion of the retraction stroke of the press head, the push-back pistons 6 remain bottomed since the pressure acting upon the lower surface of the push-back piston 11b is conveyed through the bore 45, the valve 47 and the conduit 36 into the clamping cylinders 8. It should also be noted that by connecting both the push-back and booster areas to the pressure side of the pump 62 the liquid forced out of the booster space enters the push-back space, thereby supplementing the fluid in the latter and causing a very rapid return stroke.

While the movement of the press head during the first part of the retraction stroke, i. e. until the time of unclamping the mold, is relatively slow, this is immaterial because at this point the time required for the cooling and hardening of the article in the mold is the limiting factor.

The return stroke of the press head 9 continues until the piston 11b uncovers the over-travel port 90 and the collar 94 (Figure 8) connected with the rod 93 carried by the head 9 causes, by means of the arm 95 and rod 96, the opening of the valve 91, thereby allowing the pump output to be returned to the tank. At this time, the application of clamping pressure to the clamping pistons 6 may be discontinued because of slight leakage by the pistons 6, but this is not material because no clamping is required in this position. This is the only time in the cycle when there is any possibility of the clamping pressure being released, and in fact this is not during the cycle, but at completion of the cycle during dwell at the uppermost position. The press now occupies the idling position illustrated in Figure 8 of the drawings and remains in this position until the valve core 66 is again operated.

With regard to the feeding of the material, it will be noted that as the head 9 and the platen 14 move downwardly together, no feeding occurs. However, when the platen 14 comes to rest by reason of the engagement of the injection cylinder with the upper mold half 4, continued movement of the head 9 downwardly causes the rack 56, after a predetermined period depending upon the adjustment of the vertical rod 57 to engage the pinion 53 and to cause rotation thereof in clockwise direction with respect to Figure 6. This causes feeding by the feed screw 50 into the chamber 19 in proportion to the extent of the downward travel of the injection plunger 43.

When the injection plunger 43 is withdrawn the over-running clutch embodied in pinion 53 does not feed. When the injection plunger 43 is withdrawn, the accumulated molding material in the chamber 19 falls downwardly into that portion of the injection cylinder which is surrounded by the heating tank 22.

Modification of Figures 13 and 14

Figure 13 illustrates a modified press for carrying out the method according to the present invention, in which the clamping and injecting head is moved hydraulically by hydraulic motors located above the clamping and injecting head instead of having the main hydraulic motors with boosters and push-back cylinders in the bed of the press.

In the diagrammatic illustration of Figure 13, the mold halves are omitted, but it is of course understood that the upper mold half is to be supported by the bolster 103. The clamping and injecting head 104 carries the plunger 105 and contains the clamping pistons 106 which support the bolster 103 by means of the rods 107. The injection cylinder carrying platen 108 (Figure 4) is constructed in a manner generally similar to the plunger 14 described in the embodiment of Figures 1 to 12, and is suspended in a similar manner from the clamping and injecting head.

The oil heating chamber 109 is mounted on the lower plate of the platen 108 or a rearward extension of said plate, and oil from the oil heating chamber 109 is circulated around the injection cylinder in a manner similar to that shown in Figure 4.

The clamping and injecting head 104 is reciprocated by the ram 110 which operates within the press head 111. The main pressing space 112 is above the piston 113, while the push-back space is below the piston 113 around the plunger and ram 110. The booster action is effected by the provision of a stationary piston or a booster ram 114 having an axial bore 115 extending lengthwise thereof, the booster space being designated 116.

Hydraulic and electric circuits

The liquid pressure for actuating the hydraulic motors is supplied by means of a one-way variable delivery pump 62a which is similar to the variable delivery pump 62 described in connection with the embodiment of Figures 1 to 12 and which is likewise provided with a servo-motor 100a for limiting the flow of fluid when a predetermined pressure is developed in the conduit 64a connected with the pressure side of the pump. The conduit 64a leads to inlet ports or control valves 117 and 118, valve 117 being a three-way valve, and valve 118 being a four-way valve.

The valve 117 is provided with a solenoid 119 which, when energized, is adapted to pull the valve member of the valve 117 from the normal position shown in Figure 13 downwardly against the action of the spring 119, thereby shifting the valve 117.

The valve member of the valve 118 is adapted normally to occupy the position shown in Figure 13 and to be moved upwardly by a solenoid 120. The solenoid 120 is connected parallel with a solenoid 121, which is adapted, when energized to pull its armature 122 upwardly, thereby making two circuits which will be described presently.

One side of the solenoids 120 and 121 is connected by a line 123 to the power line 124 which may be provided with an emergency switch for discontinuing application of power to the press. The other power line is designated 125. The other side of the solenoids 120 and 121 is connected by a line 126 to one side of a normally open limit switch 127, which is adapted to be actuated by a cam 128 adjustably carried on a rotor 129 supported by the head 104. The cam 128 is adapted to close the limit switch 127 when clamping of the molds has taken place and when injection is about to begin. The other side of the limit switch 127 is connected by a line 130 to a lower contact 131 adapted to be engaged by the armature 132 of a solenoid 133 which is connected in parallel with the solenoid 118. The corresponding lower contact 134 is connected by a line 135 to the power line 125.

The upper contacts 136 and 137 are adapted to be connected by the armature 138 cooperating with the solenoid 133 and connected as follows: The conduit 136 is connected by a line 139 to the power line 124, while the conduit 137 is connected to a line 140 which, in its turn, is connected to one side of the solenoids 118 and 133 and which is also connected to one side of a switch 141. The other side of the solenoids 118 and 133 is connected by a line 142 through a normally closed time switch 143 to the power line 125. The switch 143 is adapted to be opened by a timer motor 144. The other side of the switch 141 is connected by a line 145 to the line 139 and thus to the power line 124. Interposed in the line 145 is a repeat limit switch 146. For automatic operation, the switch 141 is locked up against the upper contacts.

The limit switch 146 which is closed only when the clamping and injecting head 104 is up and which is otherwise open, is adapted to be closed when the head 104 reaches the limit of its upward travel, thereby causing the press to execute another injection stroke. For manual operation, the switch 141 is pushed down for an instant against the lower pair of conduits and then released.

Another timer motor 147 is provided which is adapted to open a normally closed time switch 148, one side of which is connected by a line 149 to the power line 125 and the other side of which is connected by a line 150 to an upper contact 151 adapted to be connected by the upper switch 152 carried by the armature 122 to the point of junction 153 of the line 126 with the lower ends of the coils of the solenoids 120 and 121. The timer motors 144 and 147 are connected in parallel, one side being connected by a line 154 to the power line 125 and the other side being connected by a line 155 to a contact adapted to be engaged by a lower switch blade 156 carried by the armature 122, corresponding contact of which is connected to the line 123 leading to the power line 124.

The hydraulic connections are as follows: a conduit 157 leads from the outlet conduit 61a to the pump 62a to the servo-motor 100a. The main pressing space 112 located above the piston 113 is connected by the conduit 158 to the other surface port 159 of the valve 118. The booster space 116 is connected by means of the bore 115 and the conduit 160 to the other surface port 161 of the valve 118. The push-back space 162 is connected at its lower end by means of a conduit 162 to the surface port 164 of the valve 117. The return port 165 of the valve 117 is connected by a return conduit 166 to the tank 28a. The upper return port 167 of the valve 118 is connected by a conduit 168 to the return conduit 166. The lower return port 169 of the valve 118 is connected by a conduit 170 to the return conduit 168.

The pressure side of the fluid delivery pump 62a is adapted to communicate with the space above the clamping pistons 106 by means of a check valve 171 and a conduit 172. A conduit 173 branching off conduit 172 is adapted to convey fluid pressure from the conduit 172 to a valve member in an unloading valve 174 similar to unloading valve 140 in the embodiment of Figures 1 to 11. One side of the unloading valve 174 is adapted to communicate through a conduit 175 to the conduit 172, while the valve 174 may communicate through a conduit 176 and a check valve 177 with a conduit 158.

The operation of the device illustrated in Figure 13 is as follows: With the press idling in the position shown in Figure 13, the pump 62a is delivering pressure fluid into the conduit 64a whence it passes through the valve 118 into the conduit 160 leading to the booster space 116, and to valve 117 whence it is delivered into the conduit 163 leading to the push-back space. The main pressing space 112 is connected through the valve 118 freely back to the tank 28a by way of the conduits 168 and 166. The main piston 113 is held in its upper position because the push-back area is greater than the booster area. At the same time the output of pump 62a is being constantly delivered into the clamping space above the clamping pistons 106 by way of the check valve 171 and the conduit 172.

To start the main piston 113 downwardly, the operator closes switch 141. This energizes solenoids 119 and 133, solenoid 133 establishing a holding circuit for holding the solenoids energized and also establishing a connection between the lines 130 and 135 preparatory for the operation of the limit switch 127 by the cam 128 carried by the clamping and injecting head 104. The energization of solenoid 119 causes the shifting of the valve member of valve 117 downwardly, thereby discontinuing the application of pressure to the push-back space 162. The main piston 113 is now moved downwardly under high speed.

When the mold halves are clamped together, cam 128 closes the limit switch 127 causing energization of the solenoids 120 and 121. Energization of the solenoid 121 causes the timing motors 124 and 127 to begin rotation and also causes the establishment of a holding circuit for holding the solenoids 120 and 121 energized. Energization of solenoid 120 causes the valve member in the valve 118 to be shifted upwardly, thereby cutting off application of pressure to the booster space 116 and connecting the booster space freely back to the tank 28a by way of the conduits 170, 168 and 166. At the same time, the valve member in valve 118 causes the application of liquid pressures to the main pressing space 112. This causes the main piston 113 to continue downwardly. However, the clamping of the mold has been effected and the clamping pistons 106 now move away from the bottom of their respective cylinders, the liquid above the pistons 128 being forced through the unloading valve 174 and the conduit 176 and check valve 177, into the conduit 158 and from there into the main pressing space 112, thereby greatly increasing the speed of injection.

After a predetermined time, the timing motor 144 opens its switch 143, causing deenergization of the solenoids 119 and 133, which in its turn causes the valve 117 to shift so as to reestablish the application of liquid pressure to the push-back space 162.

Since the push-back area plus the clamping area exceeds the main area, i. e., the area at the upper end of the main piston 113, this causes the piston 113 to ascend in its return stroke. This ascension continues until the pistons 106 bottom. If the main piston 113 stops, the press maintains this position until the timing motor 147 causes the switch 93 to open, thereby deenergizing the solenoids 120 and 121 and causing the valve member in the valve 118 to resume the position shown in Figure 13. As a result thereof, communication between the main pressing area and the tank 28a is established, and fluid pressure is conveyed to the booster space 116 which is filled because it was connected freely to the tank 28a during the second portion of the downward stroke and during the first portion of the upward stroke of the piston 113. The shifting of the valve 118 also cuts off the application of fluid pressure to the main pressing space 112 and consequently, the main piston 113 moves upwardly to complete its return stroke because the push-back area exceeds the booster area.

*Summary of operation of both embodiments*

The operation of the presses illustrated in the drawings may be briefly summarized as follows:

(a) A fluid pressure is conveyed to the booster space, causing fast traverse and closing of the mold halves.

(b) Fluid pressure is applied to the main pressing space. The main pressing pistons overcome the clamping pistons causing the fluid squeezed out of the clamping space to enter the main space thereby effecting injection at high speed.

(c) After completion of the injection stroke, the main pressing space is held under pressure until a predetermined time has elapsed, whereupon pressure is applied to the push-back space while fluid pressure is continued to be applied to the main pressing space and to the clamping space (which latter is under pressure at all times). This causes the first part of retraction while the mold halves are held closed, because the clamping area in conjunction with the push-back area exceeds the main area. The retracting movement continues until the clamping pistons bottom.

(d) The clamping and injecting head stops when the clamping pistons bottom.

(e) After the head stops and a predetermined time has elapsed, liquid pressure is applied to the booster area while the main areas are connected to a fluid reservoir or tank. Since the push-back area is still connected to fluid pressure, the push-back area overcomes the smaller booster area, and the liquid squeezed out of the booster space is forced into the push-back space thereby causing a final retraction stroke. This completes the retraction stroke and the cycle.

From the foregoing it will be clear that the presses illustrated in the drawings carry out the method set forth in the objects as stated in the opening paragraph of the specification in an efficient and satisfactory manner.

It will further be noted that the individual portions of the forward and return stroke are carried out at extremely high speed wherever this is advantageous.

It will further be noted that by having the clamping area discharge into the main area, an injection stroke at very high speed is obtained. The cooperation of the pressure acting on the clamping and push-back areas in overcoming the pressure acting on the main area during the first part of the return stroke is advantageous inasmuch as it allows the injecting head to come to rest by the automatic cutting out of the clamping areas when the clamping pistons bottom, thus bringing the head to rest because the main area exceeds the push-back area. It is not necessary to have high speed during the first part of the return stroke because the mold can not be unclamped until after a relatively long period of time necessary for the cooling down of the material in the mold. By having the opposed booster area and push-back area simultaneously connected to receive the output of the pump, the return stroke is carried out at a very high speed.

Another advantage of the method according to the present invention consists in that it does away with the expense of an accumulator system heretofore necessary for pressing operations of the type involved and that it enables the said pressing operation with the use of a single pump of limited output in a minimum of time.

While it was not expressly referred to above, it will be understood that the fluid delivery pump is shifted almost to neutral or no-delivery position during the dwell at the end of the injection stroke, while the timer motor 144 in the embodiment of Figure 13 is holding the clamping and injecting head at dwell. The shifting of the fluid delivery pump to almost neutral position is accomplished automatically by building up liquid pressure in the conduits 64 and 64a respectively, and the transfer of this pressure to the servo-motor of the pump. Thus, the injection plunger is held under the injection pressure.

While the method according to the invention has been described with particular reference to the presses illustrated in the drawings, it is to be understood that the invention is not limited to these particular embodiments, but may also be carried out by modified presses, and that the invention is to be limited only as defined in the appended claims.

The apparatus herein disclosed is claimed in my copending application, Serial No. 330,868, filed April 22, 1940.

Having thus fully described my invention, what I claim as new and desire to secure by Letters Patent is:

1. A method of injecting molding plastic material by means of a machine, including a mold composed of a stationary and a movable mold portion, an injection plunger and fluid pressure devices for actuating said movable mold portion and said plunger, said method comprising the steps of applying fluid pressure to the actuating devices of the movable mold portion for advancing it relatively to the stationary mold portion for closing the mold, applying fluid pressure to the actuating devices of said plunger for initiating the injection of molding material into said mold while simultaneously applying additional pressure fluid to the actuating devices of the movable mold portion for clamping the mold portions together, and transferring a portion of the additional fluid used in clamping the mold portions together to the injection plunger actuating devices to increase the speed of injection of the material into the mold.

2. A method of injecting molding plastic material by means of a machine, including a mold composed of a stationary and a movable mold portion, an injection plunger and fluid pressure devices for actuating said movable mold portion and said plunger, said method comprising the steps of applying fluid pressure to the actuating devices of the movable mold portion for advancing it relatively to the stationary mold portion for closing the mold, applying fluid pressure to the actuating devices of said plunger for initiating the injection of molding material into said mold while simultaneously applying additional pressure fluid to the actuating devices of the movable mold portion for clamping the mold portions together, transferring a portion of the additional fluid used in clamping the mold portions together to the injection plunger actuating devices to increase the speed of injection of the material into the mold, and after a predetermined time retracting said movable mold portion to allow removal of the molded article.

3. A method of injecting molding plastic material by means of a machine, including a mold composed of a stationary and a movable mold portion, an injection plunger and fluid pressure devices for actuating said movable mold portion and said plunger, said method comprising the steps of applying fluid pressure to the actuating devices of the movable mold portion for advancing it relatively to the stationary mold portion for closing the mold, applying fluid pressure to the actuating devices of said plunger for initiating the injection of molding material into said mold while simultaneously applying additional pressure fluid to the actuating devices of the movable mold portion for clamping the mold portions together, transferring a portion of the additional fluid used in clamping the mold portions together to the injection plunger actuating devices to increase the speed of injection of the material into the mold, releasing the fluid pressure of injection while maintaining said clamping pressure, and after a predetermined time retracting said movable mold portion to allow removal of the molded article.

4. A method of injecting molding plastic material by means of a machine, including a mold composed of a stationary and a movable mold portion, an injection plunger and fluid pressure devices for actuating said movable mold portion and said plunger, said method comprising the steps of applying fluid pressure to the actuating devices of the movable mold portion for advancing it relatively to the stationary mold portion for closing the mold, applying fluid pressure to the actuating devices of said plunger for initiating the injection of molding material into said mold while simultaneously applying additional pressure fluid to the actuating devices of the movable mold portion for clamping the mold portions together, transferring a portion of the additional fluid used in clamping the mold portions together to the injection plunger actuating devices to increase the speed of injection of the material into the mold, maintaining said mold parts closed for a predetermined time and spacing said mold parts while maintaining hydraulic pressure on one of said mold parts.

WARREN R. TUCKER.